F. W. MEYER.
VALVE AND FAUCET.
APPLICATION FILED JUNE 5, 1909.
946,249.
Patented Jan. 11, 1910.
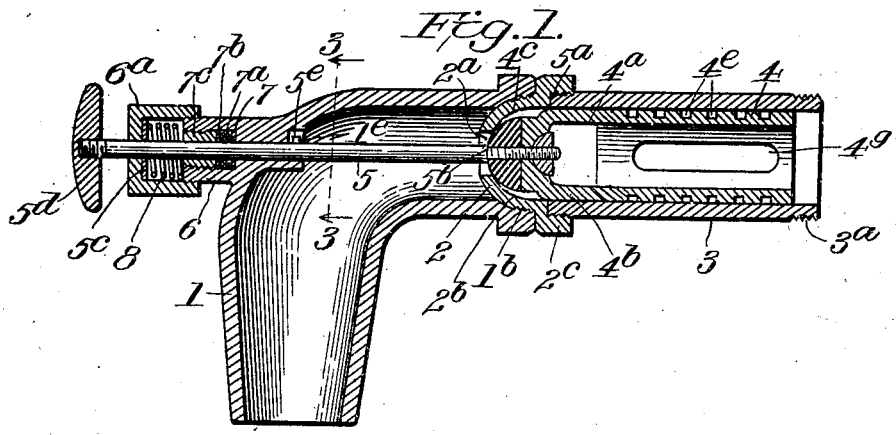

UNITED STATES PATENT OFFICE.

FRED WILLIAM MEYER, OF LOUISVILLE, KENTUCKY.

VALVE AND FAUCET.

946,249.     Specification of Letters Patent.     Patented Jan. 11, 1910.

Application filed June 5, 1909. Serial No. 500,287.

*To all whom it may concern:*

Be it known that I, FRED WILLIAM MEYER, of Louisville, in the county of Jefferson and State of Kentucky, have invented certain new and useful Improvements in Valves and Faucets; and I hereby declare that the following is a full, clear, and exact description thereof, reference being had to the accompanying drawings, which form part of this specification.

This invention is an improvement in valves and faucets for use on wash-stands and the like, where it is desired to have a practical automatically closing valve adapted to close under water pressure; and the object of the invention is to provide a valve which can be readily opened against the water pressure; may be locked open when desired; and which will be quickly closed under water pressure when released; and will have plenty of passage-way for the flow of water when opened, and will be always accurately centered relative to the valve-seat.

The invention consists in the novel construction and arrangement of parts hereinafter described and explained and I have illustrated the invention as embodied in a faucet particularly adapted for use in wash-stands.

In the drawings—Figure 1 is a longitudinal section through the faucet and valve showing the valve closed. Fig. 2 is a sectional view of the faucet, showing a side view of the valve in open position. Fig. 3 is a detail section on line 3—3, Fig. 1, looking in the direction of the arrow. Fig. 4 is a detail view of the valve carrier detached and omitting the slot $4^g$.

As shown the faucet comprises a bent head-portion 1, having a discharge opening $1^a$, and a threaded portion $1^b$ at its receiving end; into which is screwed a removable valve-seat section 2, which has a contracted opening $2^a$ in its inner end surrounded by a valve-seat $2^b$. The outer end of this section 2 may be provided with an internally threaded flange $2^c$ into which is screwed a tube 3 which forms the valve-chamber and is preferably threaded at its outer end, as at $3^a$, for connection to the pipes of the water supply system.

In the tube 3 is placed a valve which comprises a carrying cylinder 4, on the inner end of which are arms $4^a$ to which is connected a head $4^b$, that is in turn connected with the valve stem 5, which extends through the opening $2^a$ in the valve-seat portion 2, and through a stuffing-box 6, on the outer wall of the faucet head portion, above the discharge opening and in axial alinement with the tube 3.

On the inner end of the head $4^b$, and surrounding the stem 5, is a valve packing $4^c$, which is preferably of rubber and corresponds in exterior form to the seat $2^b$, so that when the carrying cylinder and valve are moved toward the stuffing-box 6, the packing $4^c$ will fit closely against seat $2^b$ and shut off the water.

The valve carrying cylinder 4 is hollow, as shown, so that water can pass freely therethrough, and when it reaches the forward end thereof it passes out through openings $4^d$ behind the head $4^b$ and over the arms $4^a$ so that a very large stream can pass to and around the valve-packing $4^c$ when the valve is opened. The cylinder 4 is also preferably externally grooved circumferentially as at $4^e$, and such circumferential grooves are intersected by longitudinal grooves $4^f$, so that water can circulate through these grooves around the tube and thus reduce the area of frictional contact between the carrier 4 and tube 3. The carrier 4 may also be slotted as at $4^g$, if desired, to facilitate the flow of water therethrough. The carrier 4 is of such external diameter however as to keep the valve packing $4^c$ and rod 5 in exact axial alinement with the tube 3 and with the valve seat $2^b$. The stem 5 may be conveniently connected to the head $4^b$ by having its inner end threaded as shown and tapped into a suitably threaded recess in the head $4^b$; and the stem may be shouldered as at $5^b$ to prevent the packing $4^c$ slipping forwardly on the rod.

The stuffing-box 6 may be packed around the rod 5, to prevent leakage of water, by means of a lead washer 7, packing $7^a$, and a brass washer $7^b$; and a jam-nut $7^c$, contained within the box 6, the outer end of the box 6 being covered by a removable cap $6^a$ threaded onto the outer end of the box, as shown.

A spring 8 may be placed within cap $6^a$ between the end of the box 6 and a disk $5^c$ on rod 5. On the outer end of rod 5 may be placed a push-button $5^d$, which may be threaded thereto as shown.

The valve may be unseated, or opened, by pushing inwardly on the button $5^d$, and it would be closed, when the pressure was removed from the button, by the pressure of the outflowing water against the carrier 4 and valve; it will be observed that water coming through the carrier 4 strikes directly behind the head 4ᵇ, where the greatest pressure is applied, as the direction of the water is changed at this point; the ordinary water pressure would be sufficient to close the valve when the faucet is arranged in a horizontal position. The spring 8 could be omitted when the faucet is to be set horizontally, although it is useful if the faucet is used in a vertical or upwardly inclined position.

As it is desirable sometimes to hold the valve open, I provide the stem 5 with a pin 5ᵉ which engages a groove 1ᵉ in a lug or enlargement within the faucet head at the inner end of the stuffing-box 6. When this valve is pushed inward this pin runs out of the groove 1ᵉ and if the rod be partially rotated the pin will lock against the inner end of the projection 1ᵈ as indicated in Fig. 3, and hold the valve open until the rod is turned so as to bring the pin 5ᵉ again into register with the slot 1ᵉ, and then, if the opening pressure is released, the valve will be closed.

The parts are all readily accessible, and by unscrewing the valve seat from the tube 3, the faucet head and valve can be readily detached from the tube 3, and the valve can then be easily removed and repacked as desired.

Having described my invention what I claim as new and desire to secure by Letters Patent thereon is:

1. In a faucet the combination of a head-portion having a discharge opening and an internally threaded receiving end, and a stuffing-box in axial alinement with the receiving end, a valve-seat-portion screwed into the receiving end of the head-portion, and a tubular-valve-chamber screwed into the seat-portion; with a cylindrical valve-carrier in the valve-chamber having passages for water in the rear of the head, a valve-rod extending through said stuffing-box and detachably connected with said head, and a valve packing on said rod around the head.

2. In a faucet the combination of a head portion having a threaded receiving end, a valve-seat-portion screwed into the receiving end of the head portion, a tube screwed into the valve-seat-portion, a valve-rod passing through the head-portion and the valve-seat-portion into said tube, a cylindrical valve-carrier in said tube connected with said rod, said carrier having a head connected with the valve-rod and lateral openings in rear of said head for the passage of water, and a valve-packing surrounding the rod and bearing against said head.

3. In a faucet, the combination of a head-portion having a discharge opening, a threaded receiving end, and a stuffing-box in axial alinement with the receiving end; a valve-seat-portion screwed into the receiving end of the head-portion, and a tubular-valve-chamber screwed into the seat-portion; with a cylindrical valve-carrier grooved exteriorly and having a valve-head on its inner ends, and lateral passages for water in the rear of the head, a valve-rod extending through said stuffing-box and detachably connected with said head, a valve-packing on said rod around the head, and a pin on said rod engaging a slot at the inner end of the stuffing-box.

4. In a valve, the combination of a head portion, a cylindric valve-chamber connected therewith having a valve-seat at its end next said head portion, a valve rod extending into said chamber, a hollow cylindric valve-carrier in said chamber having a reduced head on its end next the valve-seat and connected with the rod, and a valve on said reduced head adapted to close against said valve-seat, said cylinder having openings in rear of the head for the passage of water when the valve is opened.

5. In a valve, the combination of a head portion and a cylindric valve-chamber having a conical seat next the head portion, a valve-rod extending through the head portion into said chamber, a valve-carrier in said chamber comprising a hollow cylinder having a reduced head on its end next the seat and connected with the rod, and lateral openings, and exterior channels in rear of the head for the passage of water when the valve is open, and a valve on the reduced head of the valve carrier adapted to close against the valve-seat.

6. In a faucet the combination of a head-portion, a cylindric valve chamber, and an intermediate valve-seat-portion, a valve rod passing through the head-portion and the valve-seat-portion into said valve chamber, a cylindric valve carrier in said chamber, and a valve on said carrier connected with said rod, a slotted stuffing-box on the head-portion, through which the valve-rod passes, and a pin on said rod engaging the slot in the stuffing-box, substantially as described.

In testimony that I claim the foregoing as my own, I affix my signature in presence of two witnesses.

FRED WILLIAM MEYER.

Witnesses:
Wm. A. Spahn,
Fred. Knauer.